March 1, 1966     M. D. TOWNSEND ETAL     3,237,300
INSULATION CUTTING PLIERS HAVING PARALLEL LONGITUDINAL AND
AND TRANSVERSE CUTTING EDGES
Filed March 25, 1963

INVENTORS
MARY DOROTHY TOWNSEND
& LIONEL BRYAN KNOX TOWNSEND

BY *Shoemaker and Mattare*

ATTORNEYS

United States Patent Office 3,237,300
Patented Mar. 1, 1966

3,237,300
INSULATION CUTTING PLIERS HAVING PARALLEL LONGITUDINAL AND TRANSVERSE CUTTING EDGES
Mary Dorothy Townsend and Lionel Bryan Knox Townsend, both of 20b Cyril Mansions, Prince of Wales Drive, London SW. 11, England
Filed Mar. 25, 1963, Ser. No. 267,437
1 Claim. (Cl. 30—91)

The invention relates to wire strippers for facilitating baring insulated electric conductors such as wire, cable and the like.

When stripping the insulation from portions of electric conductors, it is important that the stripper cuts the insulation deeply and cleanly to facilitate its removal but without penetrating so deeply as to cut or mark the core because such cuts or marks constitute places of weakness which may hasten mechanical failure. Further, it is desirable that the stripper be effective to make all the necessary incisions in the insulation in a minimum number of operations and that it be possible to use the stripper to cut the insulation at a position intermediate the ends of the conductor or at its ends.

The invention has been developed with the above considerations in mind. According to the invention, a stripper for facilitating baring of an insulated electric conductor intermediate its ends comprises two jaws, means mounting the jaws for relative parallel motion towards and away from one another, each jaw being provided with a respective one edge of two spaced pairs of co-operating cutting edges, each pair being effective to cut the insulation circumferentially of the conductor as the jaws are brought together over it, and means carried by each jaw extending between the pairs of edges effective simultaneously to slit the insulation between the spaced circumferential cuts, the cutting edges of each pair being such that, when the edges are brought fully together, they define between each other an aperture having a cross-section which is no smaller than that of the core of the conductor to be stripped.

Preferably, the pairs of cutting edges are provided on members which are releasably secured to the jaws to facilitate removal for sharpening the cutting edges and for permitting them to be replaced by cutting edges shaped to suit other sizes or cross-sectional configurations of conductor cores. The slitting means may be one or more longitudinal cutting edges on each jaw preferably also provided on replaceable members, which may be the same members as those on which the circumferential cutting edges are provided. Where there are two or more longitudinal cutting edges on each jaw, these are conveniently separated by a channel or channels in which part of the incised insulation and part of the conductor core can be accommodated when the jaws are closed, thereby assisting in the proper location of the conductor relatively to the cutting edges.

The stripper according to the invention may be in the form of a hand tool in which both jaws are movable or a manually or power operated bench tool where only one jaw need move relatively to the other but in both cases the jaws remain in the same relative rotary position as they are brought together or apart. In either case, the tool can include a severing instrument for parting the stripped core. Also, heating means may be provided in or on the jaws, or the members carrying the cutting edges, to assist in cutting through tough thermoplastics insulation.

In the case of a bench tool, a battery of manually or power operated strippers according to the invention may be arranged, for example aligned in a row, to bare a number of portions of a single cable or wire at predetermined intervals in a single operation.

An example of the invention is illustrated in the accompanying drawings wherein.

Figure 1:
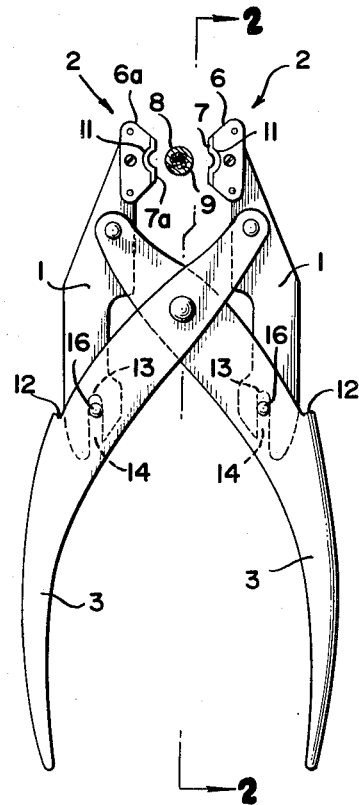
FIG. 1 is a side elevation of a stripper according to the invention in the form of a hand tool, the cross-section of an insulated cable being shown between its jaws.

The wire stripper according to the invention facilitates baring of electric conductors by incising or scoring parts of the insulation. Whilst the term "stripper" is employed, it is to be understood that the tool according to the invention does not necessarily actually remove the incised insulation. This can usually be done more speedily by hand or with the aid of a jet of compressed air, the latter method being particularly suitable where the stripper is in the form of a bench tool forming part of a mass production assembly line.

The illustrated stripper in the form of a hand tool comprises two relatively movable jaws 1 each having releasably secured to it a cutting head 2 and each hinged to a handle 3 so that the cutting heads may be moved towards and away from one another in a manner described hereinafter. Each cutting head comprises a housing or block 4 fitted with two replaceable spaced blades 6 or 6a having ground cutting edges 7 or 7a, respectively, the opposed cutting edges constituting two spaced pairs of cutting edges which can co-operate to incise the insulation 8 of a cable circumferentially thereof as the jaws are brought together. The circular-section cable shown in FIGS. 1, 4 and 5 for which the illustrated cutting edges are designed has plastics, rubber, cotton or silk insulation 8 and a core 9 comprising, say, seven strands of twisted wire. The spacing of the blades 6, 6 or 6a, 6a determines the maximum length of bared portion of the conductor.

The cutting edges 7, 7a are provided with semi-circular concave portions 11 so that, when the jaws are closed, i.e. when the cutting edges of each pair are brought fully together, they define between each other a circular aperture which is no smaller than the cross-section of the core 9 of the cable. Stops (not shown) may be provided to limit the forcible approach of the jaws 1 towards each other so that undue pressure between the edges 7, 7a of each pair is avoided as soon as they have been brought together. The amount of opening of the jaws may be limited by stops 12 on the handles 3 which come to abut against the jaws, and/or stops 13 formed by the ends of parallel rectilinear guideways 14 in the jaws for guide pins 16 carried by the handles. It is these guide pins 16 and slots or guideways 14 that constitute means mounting the jaws to ensure parallel movement of the jaws as the handles are operated.

Figure 2:
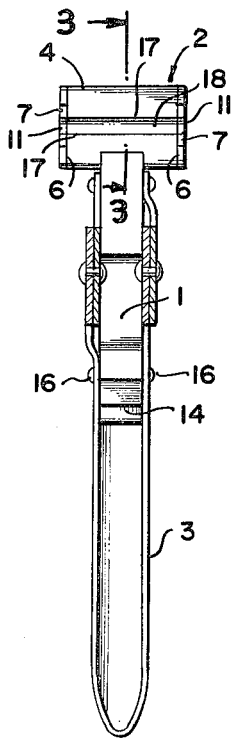
FIG. 2 is a sectional elevation taken on the line II—II in FIG. 1.
Figure 3:
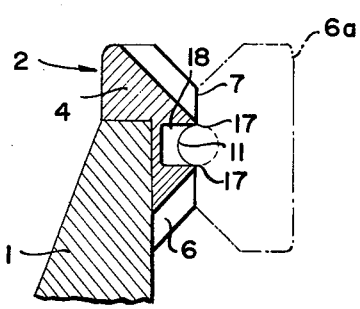
FIG. 3 is an enlarged sectional elevation taken on the line III—III in FIG. 2.

Each cutting head 2 is also provided with two longitudinal cutting edges 17 formed on the housing or block 4 to extend between the circumferential cutting edges 7 or 7a and suitable for slitting the insulation 8 between the circumferential cuts. The edges 17 may be straight and at right angles to the edges 7, 7a, as shown in FIG. 2, or they may extend helically to conform substantially with the twist of the wires in the core 9 of the cable, which would make it easier to slit the insulation longitudinally. The longitudinal cutting edges 17 are separated by a channel 18 in the housing 4 for receiving part of the incised insulation in the closed position of the cutting heads.

Figure 4:
FIG. 4 is a fragmentary view illustrating the cable of FIG. 1 where the insulation has been incised intermediate its ends.
Figure 5:
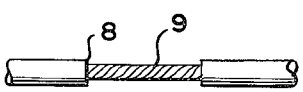
FIG. 5 is a fragmentary view similar to FIG. 4 showing the incised insulation removed.

In use, the cutting heads are chosen primarily so that their cutting edges suit the core of the cable which is to be stripped. The cable is simply located between the jaws as shown in FIG. 1 and the jaws are then closed. This causes the edges 7, 7a to make two spaced circumferential cuts 19 in the insulation, as shown in FIG. 4. At the same time, the edges 17 slit the insulation in four places, as shown at 21, two of the resultant longitudinal strips of insulation being accommodated in the channels 18. The cuts 19 and slits 21 are particularly clean and damage to the core 9 is minimized, by virtue of the parallel movement of the jaws 1 so that the cutting heads 2 are not rotated as they approach one another over the cable. This ensures uniform engagement of all the cutting edges with the insulation. It is now a simple matter to remove the incised insulation to leave the core 9 bare at a portion intermediate its length. However, the stripper may be used just as effectively at the end of a cable or the bared core 9 shown in FIG. 5 may be severed to form two cables each having the core bared at an end. For this purpose, the stripper may incorporate a conventional parting tool, for example two opposed cutting edges each located on one of the cutting heads 2 intermediate the blades 6 or 6a at the position corresponding to the section line III—III in FIG. 2.

In cases where the conductor comprises more than one layer of insulation, the selected cutting heads may be designed to cut through all the insulating layers in one operation but it is also possible to cut and remove the layers in more than one step by using an appropriate number of different cutting heads or different strippers.

We claim:

An insulation cutter and stripper for cutting and removing insulation from a electrical conductor intermediate the ends thereof, comprising a pair of handles, each handle having two end portions, the handles crossing adjacent to one end portion of each, pivot means joining the handles at the crossing, jaw members pivoted to each handle at the one end portion beyond the pivot means, pins mounted in each handle beyond the pivot means in the opposite direction from the pivot means and at a distance substantially equal to the distance between the pivot means and the jaw pivot, each jaw having end portions, the first end portion of each jaw having an open ended guideway therein engaging and moving on each pin, the other end portion of each jaw having a releasably secured cutting head thereon, each cutting head having spaced transverse cutting edges thereon which when the two cutting heads are in engagement form pairs of transversely spaced cooperating cutting edges which will cut the insulation, each cutting head and edge having a longitudinal semi-circular concave portion therein, the concave portion being sized so as to not be smaller than the conductor, each cutting head having a pair of longitudinal cutting edges on each edge of the concave portion, the transverse cutting edges cutting the insulation circumferentially and the longitudinal cutting edges cutting diametrically opposed slits in the insulation between and joining the circumferential cuts without rotation of the cutter and stripper, the pins and guideways moving the jaws into engagement by relative parallel motion toward each other when the handles are moved toward each other on the pivot means, and stops means on each handle outwardly of the pins, each stop means engaging the first end portion of each jaw to limit the separation of the jaws.

References Cited by the Examiner

UNITED STATES PATENTS

| | | |
|---|---|---|
| 435,414 | 9/1890 | Fisher. |
| 973,760 | 10/1910 | Cirves. |
| 1,019,835 | 3/1912 | Prack. |
| 1,305,513 | 6/1919 | Bernard. |
| 1,396,903 | 11/1921 | Weber. |
| 2,594,363 | 4/1952 | Stephenson. |
| 2,817,255 | 12/1957 | Lormeau. |
| 2,978,565 | 4/1961 | Sullivan et al. |
| 2,984,905 | 5/1961 | Harmon. |
| 3,122,036 | 2/1964 | Flower et al. |

FOREIGN PATENTS

| | | |
|---|---|---|
| 1,080,647 | 4/1960 | Germany. |
| 386,568 | 1/1933 | Great Britain. |
| 133,509 | 11/1951 | Sweden. |

WILLIAM FELDMAN, *Primary Examiner.*

MILTON S. MEHR, *Examiner.*